United States Patent
Aoyama (10) Patent No.: US 9,446,457 B2
(45) Date of Patent: Sep. 20, 2016

(54) DRILL BODY OF INDEXABLE DRILL

(75) Inventor: Takuma Aoyama, Toyokawa (JP)

(73) Assignee: OSG CORPORATION, Toyokawa-Shi (JP)

( * ) Notice: Subject to any disclaimer, the term of this patent is extended or adjusted under 35 U.S.C. 154(b) by 111 days.

(21) Appl. No.: 14/344,449

(22) PCT Filed: Sep. 16, 2011

(86) PCT No.: PCT/JP2011/071276
§ 371 (c)(1),
(2), (4) Date: Mar. 12, 2014

(87) PCT Pub. No.: WO2013/038565
PCT Pub. Date: Mar. 21, 2013

(65) Prior Publication Data
US 2014/0341667 A1 Nov. 20, 2014

(51) Int. Cl.
*B23B 51/04* (2006.01)
*B23P 15/32* (2006.01)

(52) U.S. Cl.
CPC ......... *B23B 51/048* (2013.01); *B23B 51/0493* (2013.01); *B23P 15/32* (2013.01);
(Continued)

(58) Field of Classification Search
CPC .................. Y10T 408/9097; Y10T 408/9095; Y10T 408/905; Y10S 408/905; B23B 2251/408; B23B 2251/422; B23B 2251/14; B23B 2251/402; B23B 2251/404; B23B 2251/48; B23B 51/048; B23B 51/0493; B23B 51/02; B23B 2251/406; B23P 15/32
See application file for complete search history.

(56) References Cited

U.S. PATENT DOCUMENTS

| 4,728,231 A * | 3/1988 | Kunimori | B23B 51/02 408/144 |
| 6,250,857 B1 * | 6/2001 | Kersten | B23B 51/02 175/394 |

(Continued)

FOREIGN PATENT DOCUMENTS

| CN | 101056996 A | 10/2007 |
| CN | 101234432 A | 8/2008 |

(Continued)

OTHER PUBLICATIONS

JIS B 0601:2001 Geometrical Product Specification (GPS)—Surface texture: Profile method—Terms, definitions and surface texture parameters Publisher: Japanese Standards Association Published: Jan. 20, 2001.*

(Continued)

*Primary Examiner* — Eric A Gates
*Assistant Examiner* — Donte Brown
(74) *Attorney, Agent, or Firm* — Oliff PLC (57) ABSTRACT

A drill main body of an indexable drill is disposed first and second spiral flutes on a column-shaped outer circumferential surface with an inner blade tip cutting a hole center side mounted on a tip portion of the first spiral flute and an outer blade tip cutting a hole outer circumferential side mounted on a tip portion of the second spiral flute and the drill main body discharges chips through the first spiral flute and the second spiral flute toward a shank while hole machining is performed with the inner blade tip and the outer blade tip. The drill is a deep hole machining drill having a length of the first spiral flute and the second spiral flute equal to or greater than 4D relative to a drill diameter D that is an outer diameter of the outer blade tip.

5 Claims, 8 Drawing Sheets (52) U.S. Cl.
CPC ..... *B23B 2251/14* (2013.01); *B23B 2251/402* (2013.01); *B23B 2251/404* (2013.01); *B23B 2251/408* (2013.01); *B23B 2251/422* (2013.01); *Y10T 408/9097* (2015.01)

(56) References Cited

U.S. PATENT DOCUMENTS

| | | |
|---|---|---|
| 2006/0260439 A1 | 11/2006 | Tubinger et al. |
| 2008/0181737 A1 | 7/2008 | Limell et al. |
| 2012/0063857 A1 | 3/2012 | Onozawa |

FOREIGN PATENT DOCUMENTS

| | | | |
|---|---|---|---|
| JP | A 63-245310 | 10/1988 | |
| JP | A 10-180514 | 7/1998 | |
| JP | A 11-90715 | 4/1999 | |
| JP | 3166645 B2 | 5/2001 | |
| JP | 2001-191205 A | 7/2001 | |
| JP | A 2006-212722 | 8/2006 | |
| JP | 4056403 B2 * | 3/2008 | ............. B23B 51/02 |
| WO | WO 2010/140606 A1 | 12/2010 | |
| WO | WO 2010137701 A1 * | 12/2010 | ........... B23B 51/048 |
| WO | WO 2010140606 A1 * | 12/2010 | ........... B23B 51/048 |

OTHER PUBLICATIONS

May 6, 2015 Office Action issued in Chinese Patent Application No. 201180073457.X.

Apr. 14, 2015 Search Report issued in European Patent Application No. 11872317.0.

Nov. 29, 2011 Search Report issued in International Patent Application No. PCT/JP2011/071276 (with translation).

Jan. 15, 2016 Office Action issued in Chinese Patent Application No. 201180073457.X.

Jul. 1, 2016 Office Action issued in European Patent Application No. 11872317.0.

Jul. 28, 2016 Office Action issued in Chinese Patent Application No. 201180073457.X.

* cited by examiner

| MACHINED FLUTE | MACHINING TOOL | TOOL DIAMETER | MACHINING TYPE | CUTTING SPEED (m/min) | ROTATION NUMBER (min⁻¹) | FEED PER TOOTH (mm/t) | TABLE FEED (mm/min) |
|---|---|---|---|---|---|---|---|
| INNER BLADE SIDE | TWO-FLUTE BALL END MILL | φ12 | ROUGH | 20 | 531 | 0.047 | 50 |
| | | | FINISH | 50 | 1326 | 0.038 | 100 |
| OUTER BLADE SIDE | TWO-FLUTE BALL END MILL | φ11 | ROUGH | 20 | 579 | 0.043 | 50 |
| | | | FINISH | 50 | 1447 | 0.035 | 100 |

| WORK MATERIAL | CUTTING SPEED (m/min) | FEED SPEED (mm/rev) |
|---|---|---|
| SUS304 | 100 | 0.1 |
| SCM440 | 120 | 0.12 |
| S50C | 150 | 0.12 |

DRILL BODY OF INDEXABLE DRILL

TECHNICAL FIELD

The present invention relates to an indexable drill and particularly to a drill main body achieving excellent chip discharge performance even in a deep hole machining drill having a flute length L equal to or greater than 4D relative to a drill diameter D.

BACKGROUND ART

In a known indexable drill, an outer circumferential surface of a column-shaped drill main body is disposed with a pair of first and second spiral flutes with an inner blade tip cutting a hole center side mounted on a tip portion of the first spiral flute and an outer blade tip cutting a hole outer circumferential side mounted on a tip portion of the second spiral flute and, while hole machining is performed with the inner blade tip and the outer blade tip, chips are discharged through the first spiral flute and the second spiral flute toward a shank (see Patent Document 1).

PRIOR ART DOCUMENT

Patent Document

Patent Document 1: Japanese Laid-Open Patent Publication No. 11-90715

SUMMARY OF THE INVENTION

Problem to be Solved by the Invention

However, such a conventional indexable drill has a problem that sufficient chip discharge performance is not necessarily achieved, resulting in reduction in durability (tool life) because of occurrence of wear, blade Chipping, breakage etc., due to clogging of chips and unstable hole machining and limitation of machining conditions because of increased cutting resistance due to clogging of chips. Particularly, such a problem is prominent in the case of a deep hole machining drill having a flute length L equal to or greater than 4D relative to a drill diameter D.

The present invention was conceived in view of the situations and it is therefore an object of the present invention to further improve chip discharge performance through a pair of spiral flutes disposed in a drill main body of an indexable drill.

Means for Solving the Problem

To achieve the object, the first aspect of the invention provides a drill main body of an indexable drill disposed with a pair of first and second spiral flutes on a column-shaped outer circumferential surface with an inner blade tip cutting a hole center side mounted on a tip portion of the first spiral flute and an outer blade tip cutting a hole outer circumferential side mounted on a tip portion of the second spiral flute, the drill main body of an indexable drill discharging chips through the first spiral flute and the second spiral flute toward a shank while hole machining is performed with the inner blade tip and the outer blade tip, the first spiral flute and the second spiral flute being mirror-finished through cutting by a ball end mill after a hardening heat treatment is applied.

The second aspect of the invention provides the drill main body of an indexable drill recited in the first aspect of the invention, wherein surface roughness of the first spiral flute and the second spiral flute is 0.4 μm or less in terms of arithmetic average roughness Ra and 1.6 μm or less in terms of maximum height roughness Rz as a result of the mirror finishing.

The third aspect of the invention provides the drill main body clan indexable drill recited in the first or second aspect of the invention, wherein (a) the first spiral flute is formed with a constant flute bottom diameter, or with a flute bottom diameter having a positive gradient such that the flute bottom diameter increases toward the shank, in axial direction, and wherein (b) the second spiral flute is formed with a flute bottom diameter having a negative gradient such that the flute bottom diameter decreases toward the shank in axial direction. The flute bottom diameter means a diameter to a flute bottom around the axial center of the drill main body.

The fourth aspect of the invention provides the drill main body of an indexable drill recited in any one of the first to third aspects of the invention, wherein (a) the first spiral flute and the second spiral flute are disposed with respective tip mounting recesses cut out at substantially right angle for mounting the inner blade tip and the outer blade tip on a drill main body tip side, and wherein (b) at least the tip mounting recess for mounting the inner blade tip has a side wall disposed with a chip breaker having a arc-shaped cross-section from a tip of the drill main body to the first spiral flute.

The fifth aspect of the invention provides the drill main body of an indexable drill recited in any one of the first to fourth aspects of the invention, wherein the drill is a deep hole machining drill having a length L of the first spiral flute and the second spiral flute equal to or greater than 4D relative to a drill diameter D that is an outer diameter of the outer blade tip.

The sixth aspect of the invention provides a manufacturing method of the drill main body of an indexable drill recited in any one of the first to fifth aspects of the invention, comprising; (a) a flute roughing process of roughing each of the first spiral flute and the second spiral flute through cutting by a ball end mill; (b) a heat treatment process of performing a hardening heat treatment using quenching and tempering after the flute roughing process; and (c) a flute finishing process of mirror-finishing the first spiral flute and the second spiral flute through cutting with a stock mount of 0.3 mm or less by the same ball end mill used in the flute roughing process, after the heat treatment process.

Effects of the Invention

In the drill main body of an indexable drill of the first aspect of the invention, since the first spiral flute and the second spiral flute are mirror-finished though cutting by a ball end mill after a hardening heat treatment is applied, the friction of the flute inner surfaces is reduced and chips are favorably discharged. This suppresses wear, blade chipping, breakage etc., due to clogging of chips and improves durability (tool life) even in the drill main body for deep hole machining having longer flute length L. An increase in cutting resistance due to clogging of chips is suppressed so that stable hole machining can be performed, and limiting machining conditions for enabling the hole machining are alleviated so that a machinable range is expanded.

In the second aspect of the invention, the arithmetic average roughness Ra is 0.4 μm or less and the maximum height roughness Rz is 1.6 μm or less as a result of the mirror finishing and, therefore, chip discharge performance improving effect is properly acquired through reduction in friction of the flute inner surfaces of the first spiral flute and the second spiral flute.

In the third aspect of the invention, although the first spiral flute mounting an inner blade tip is formed with a constant flute bottom diameter, or with a flute bottom diameter having a positive gradient such that the flute bottom diameter increases toward the shank, in axial direction, the inner blade tip cuts the hole inner circumferential side, therefore the flute bottom diameter must be reduced at a cutting edge portion thereof (tip portion of the drill main body), and the flute bottom diameter is defined to be constant or a positive gradient to acquire predetermined rigidity while ensuring chip discharge performance. Although the second spiral flute mounting an outer blade tip is formed with a flute bottom diameter having a negative gradient such that the flute bottom diameter decreases toward the shank in axial direction, the outer blade tip cuts the hole outer circumferential side, therefore a flute depth may be shallow at a cutting edge portion thereof (the tip portion of the drill main body), and the flute bottom diameter is increased to acquire high rigidity while the flute bottom is set to a negative gradient to make a flute cross section area larger toward the shank to achieve higher chip discharge performance. By separately and properly defining an axial change gradient of a flute bottom of the first spiral flute and the second spiral flute in this way, the respective discharge performances of chips generated by the inner blade tip and the outer blade tip and the rigidity of the drill main body can be ensured in a balanced manner.

In the fourth aspect of the invention, since at least the tip mounting recess for mounting the inner blade tip has a side wall disposed with a chip breaker having a arc-shaped cross-section from a tip of the drill main body to the first spiral flute, chips generated by the inner blade tip are favorably segmented and the chip discharge performance is further improved. Therefore, for example, even if hole machining is performed for a viscous work material, the chips are segmented and properly discharged and the clogging of chips is suppressed.

The fifth aspect of the invention recites the drill main body for deep hole machining having a length L equal to or greater than 4D relative to a drill diameter D and although the clogging of chips more easily occurs due to the longer flute length L, the first spiral flute and the second spiral flute are mirror-finished after the hardening heat treatment, therefore chip discharge performance is improved and various effects are more prominently be achieved in association with the improvement in the chip discharge performance.

The sixth aspect of the invention recites a manufacturing method of the drill main body of an indexable drill recited in any one of the first to fifth aspects of the invention and besides acquisition of substantially the same effects as the first to fifth aspects of the invention, since in the flute finishing process, cutting is performed with a stock amount of 0.3 mm or less by the same ball end mill used in the flute roughing process, the flute inner surfaces of the first spiral flute and the second spiral flute can properly be mirror-finished.

MODE FOR CARRYING OUT THE INVENTION

Although the present invention is preferably applied to a deep hole machining drill main body having a flute length L equal to or greater than 4D, particularly equal to or greater than 5D, relative to a drill diameter D, the present invention may be applied to a drill main body having the flute length L less than 4D. The flute length L is a dimension (effective flute length) from a position immediately before cutoff of the first spiral flute and the second spiral flute on the shank side to the tip of the drill main body and, if the first spiral flute and the second spiral flute have different flute lengths L, the flute length L in a shorter direction may be employed. A direction of helix of the first spiral flute and the second spiral flute is determined depending on a drill rotation direction such that chips generated by an inner blade tip and an outer blade tip are discharged toward a shank. Therefore, the flutes have a right-hand helix if the drill is rotationally driven clockwise for hole machining when viewed from the shank, and the flutes have a left-hand helix if the drill is rotationally driven anticlockwise for hole machining. Material of the drill main body may be steel material that can be subjected to hardening heat treatment using quenching etc., such as high speed tool steel, alloy tool steel, and carbon tool steel, for example. A ball end mill for mirror finishing after the hardening heat treatment is desirably made of a super hard tool material such as cemented carbide and ceramic.

The inner blade tip and the outer blade tip correspond to throwaway tips defined by JIS and are thrown away without regrinding or may be reground for reuse. Although these tips are removably mounted on the drill main body, for example, by screws, another clamping means or fixing means can be employed. Although a super hard tool material such as cemented carbide and ceramic is preferably used for the material of the chips, high speed tool steel etc., can also be employed.

The mirror finishing by the ball end mill is performed though cutting with a stock amount of 0.3 mm or less, for example, and the stock amount is appropriately defined in consideration of distortion due to the hardening heat treatment, a drill diameter, etc., and although the cutting is desirably performed with a stock amount of 0.25 mm or less, the cutting can be performed with a stock amount greater than 0.3 mm. Although different ball end mills with different tool diameters etc., can be used for the first spiral flute and the second spiral flute, common ball end mills with equal tool diameters etc., can be used if flute widths are equal. Although arithmetic average roughness Ra is 0.4 μm or less and maximum height roughness Rz is 1.6 μm or less as a result of the mirror finishing in the second aspect of the invention, it is more desirable that the arithmetic average roughness Ra is 0.3 μm or less and that the maximum height roughness Rz is 1.5 μm or less. Polishing such as aerolapping may be performed and surface treatment such as plating may be applied as needed. The arithmetic average roughness Ra and the maximum height roughness Rz are obtained from a roughness curve measured by a tracer method in accordance with "B 0601 (revised in 2001)" defined by JIS.

Although the first spiral flute has a constant flute bottom diameter or a flute bottom with a positive gradient in an axial direction and the second spiral flute has a flute bottom with a negative gradient in the axial direction in the third aspect of the invention, the spiral flutes can be formed with, a constant flute bottom diameter or sloped at the same gradient in the axial direction in the implementation of the first aspect of the invention. The first spiral flute of the third aspect of the invention is disposed with an axial gradient in a range of about 0 to +0.6 degrees, for example, and the second spiral flute is disposed with an axial gradient in a range of about −0.2 to −1 degrees, for example. Although these axial gradients are desirably constant over the whole length of the spiral flutes, the gradients may somewhat change or may gradually decrease or increase.

Although a chip breaker is disposed at least on a side wall of a tip mounting recess on which the inner blade tip is mounted and a chip breaker can be disposed on a side wall of a tip mounting recess on which the outer blade tip is mounted in the fourth aspect of the invention, these chip breakers may not be included in the implementation of another aspect of the invention. The chip breakers are desirably formed to have, for example, an arc-shaped cross section with a radius of about 7 mm or less by a ball end mill etc., and disposed in a depth of about 1 mm or more. The tip mounting recesses are disposed to lead to the spiral flutes by side machining such that a square end mill forms a tip mounting seat surface with an end cutting edge and a side wall with a peripheral cutting edge. The tip mounting seat surface is disposed with, for example, a recessed tip mounting seat so that the tip is positioned and fixed by a screw etc.

Although the sixth aspect of the invention is an example of a manufacturing method capable of preferably manufacturing the drill main body of the first to fifth aspects of the invention and the same ball end mill is used for cutting in a flute roughing process and a flute finishing process, different ball end mills may be used for cutting in the flute roughing process and the flute finishing process in the implementation of the first to fifth aspects of the invention. In the flute finishing process of the sixth aspect of the invention, for example, the cutting is performed by inserting the ball end mill deeper by a predetermined stock amount toward an axial tip side as compared to the flute roughing process and the stock amount of the tip portion is 0.3 min or less. In this case, the stock amount is made smaller as a distance from the tip of the ball end mill increases. For example, high speed cutting with a cutting speed equal to or greater than 40 m/min is desirable for the flute finishing process.

EXAMPLE

An example of the present invention will now be described in detail with reference to the drawings.

Figure 1:
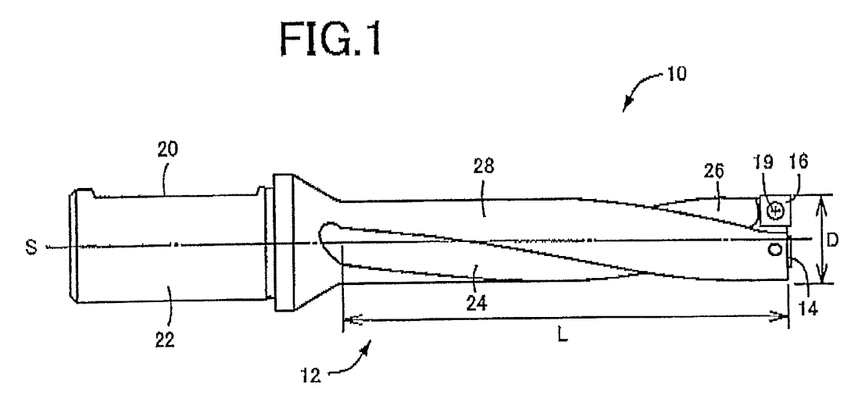
FIG. 1 is a plane view of an indexable drill that is an example of the present invention.
Figure 2:
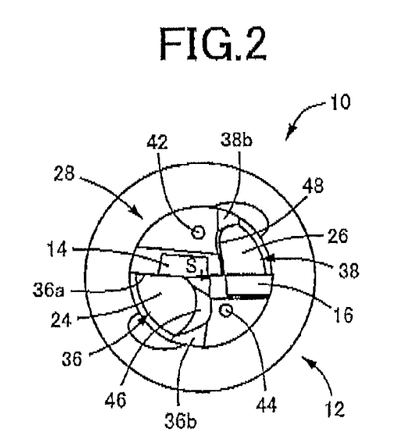
FIG. 2 is an enlarged bottom surface view of the indexable drill in FIG. 1 from a tip side (right side of FIG. 1).
Figure 3:
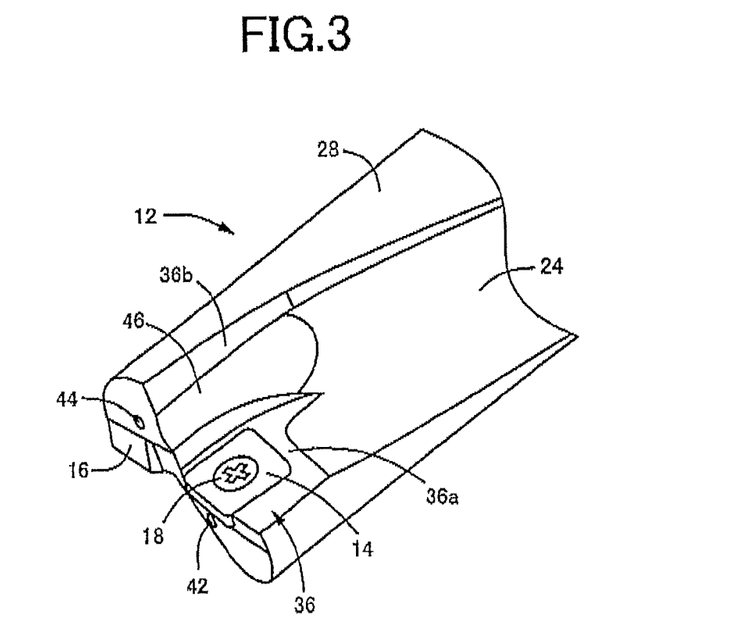
FIG. 3 is a perspective view of a tip portion of the indexable drill in FIG. 1.

FIG. 1 is a plane view of an indexable drill 10 that is an example of the present invention viewed from a direction orthogonal to an axial center S; FIG. 2 is an enlarged bottom surface view from a tip side (right side of FIG. 1); and FIG. 3 is an enlarged perspective view of a tip portion. The indexable drill 10 is used with a pair of inner and outer blade tips 14 and 16 removably and integrally mounted by mounting screws 18 and 19, respectively, on a tip portion of a column-shaped drill main body 12. The inner blade tip 14 is used for cutting a hole center side and mounted near an axial center S of the drill main body 12 and the outer blade tip 16 is used for cutting the hole outer circumferential side and mounted on an outer circumferential side of the drill main body 12. These inner and outer blade tips 14 and 16 are made of cemented carbide and formed into a flat square plate shape and have a cutting edge dimension (length dimension of one side of a square) for overlapping and cutting in a radial direction around the axial center S. In this example, a drill diameter D is 25 mm and a length of a side of the inner and outer blade tips 14 and 16 is 8 mm. Each of the inner and outer blade tips 14 and 16 is mounted to slightly project toward a tip side of the drill main body 12 and a projecting portion is disposed with a cutting edge for hole machining.

The drill main body 12 is made of tool steel such as SKD61 (about HRC55) (alloy tool steel defined by HS) and integrally includes on the common axial center S a shank 22 disposed with a flat cutout 20 and a body 28 disposed with a pair of first and second spiral flutes 24 and 26 on an outer circumferential surface. These first and second spiral flutes 24 and 26 have a right-hand helix with a helix angle of about 16 degrees in this example and are rotationally driven clockwise when viewed from the shank 22 for the hole machining with the inner blade tip 14 and the outer blade tip 16, and chips generated by the inner blade tip 14 and the outer blade tip 16 are discharged through each of the first spiral flute 24 and the second spiral flute 26 toward the shank 22.

Figure 6:
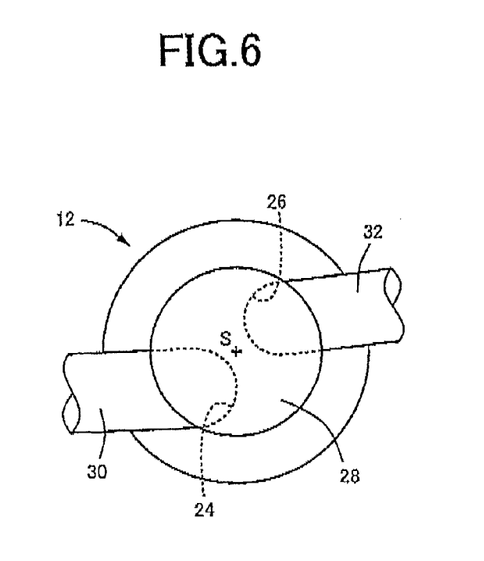
FIG. 6 is a diagram for explaining the flute roughing process in FIG. 5.

The first spiral flute 24 and the second spiral flute 26 are formed by cutting with ball end mills 30 and 32 as depicted in FIG. 6. As apparent from FIG. 6, each of the ball end mills 30 and 32 cut in the drill main body 12 in a direction offset by a predetermined dimension from the axial center S in a plane orthogonal to the axial center S and are relatively moved in an axial center S direction in this state while the drill main body 12 is rotated around the axial center S, thereby forming each of the first and second spiral flutes 24 and 26 with a predetermined helix angle. Although FIG. 6 depicts the both ball end mills 30 and 32 cutting into the body 28, the cutting may separately be performed.

Figure 8:
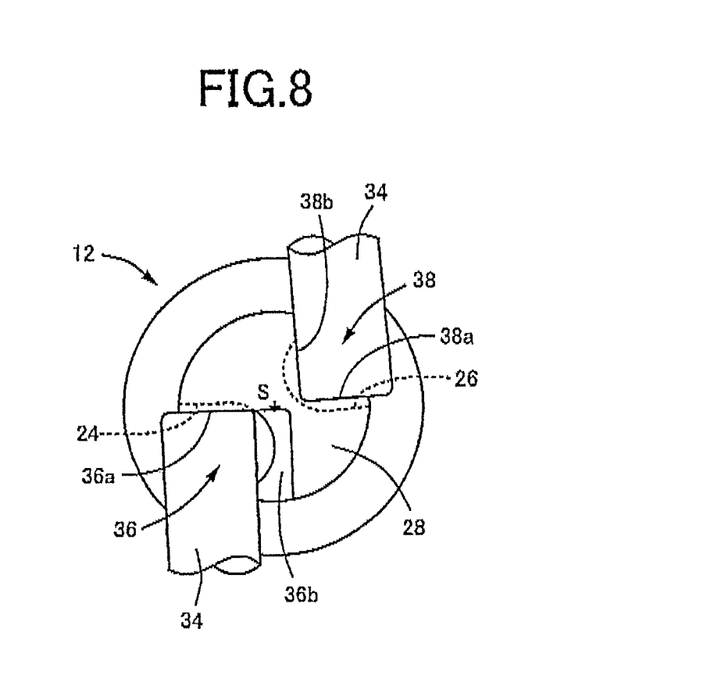
FIG. 8 is a diagram for explaining a tip seat finishing process in FIG. 5.

The first spiral flute 24 and the second spiral flute 26 are disposed on an outer circumferential surface of the body 28 except a predetermined dimension of a tip portion of the body 28 and the tip portion is disposed with tip mounting recesses 36 and 38 by using a common square end mill 34 as depicted in FIG. 8. The tip mounting recesses 36 and 38 are formed by cutting and removal at substantially right angle through side machining such that the square end mill 34 forms tip mounting seat surfaces 36a and 38a with an end cutting edge and side walls 36b and 38b with a peripheral cutting edge, and are disposed to lead to the first spiral flute 24 and the second spiral flute 26, respectively. The tip mounting seat surfaces 36a and 38a are disposed with respective recesses (tip mounting seats), and the inner blade tip 14 and the outer blade tip 16 are integrally fixed by the mounting screws 18 and 19 in an embedded and positioned manner. Although FIG. 8 depicts a pair of the tip mounting recesses 36 and 38 machined at the same time by the square end mills 34, the cutting is separately performed.

The flute lengths L of the first spiral flute 24 and the second spiral flute 26, i.e., dimensions (effective flute lengths) from positions immediately before cutoff on the shank 22 side (axial center positions of the end mills 30 and 32 at flute end portions) to the tip of the body 28 are equal to each other and formed with a length dimension equal to or greater than 4D relative to a drill diameter D that is an outer diameter of the outer blade tip 16. This example uses the drill diameter D=25 mm and the flute length L=125 mm=5D and deep hole machining up to 5D can be performed. A radial dimension of the body 28 is slightly smaller than the drill diameter D and is about 24 mm. A tool diameter of the ball end mill 30 cutting the first spiral flute 24 is 12 mm (tip R is 6 mm) and a tool diameter of the ball end mill 32 is 11 mm (tip R is 5.5 mm) so that the first spiral flute 24 on a side provided with the inner blade tip 14 is disposed to have a larger flute width and come closer to the axial center S as compared to the second spiral flute 26. If the drill diameter D is small and chips are relatively small in amount, the tool diameters of the ball end mills 30 and 32 may be the same. In other words, the flute widths of the first spiral flute 24 and the second spiral flute 26 may be the same.

Figure 4:
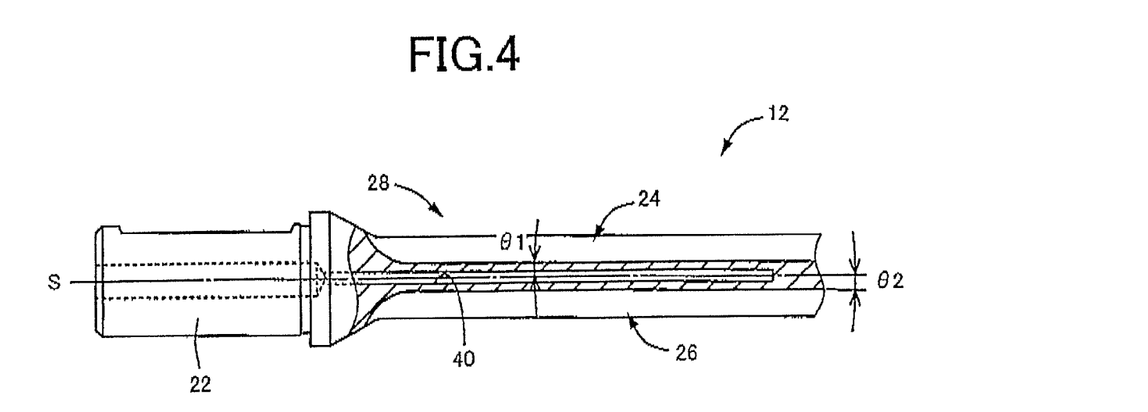
FIG. 4 a cross-sectional view depicting a pair of spiral flutes of the indexable drill in FIG. 1 in a plane parallel to the axial center S.

FIG. 4 is a cross-sectional view for explaining axial changes in flute bottom diameters of the first spiral flute 24 and the second spiral flute 26 and depicts the spiral flutes 24 and 26 in a plane parallel to the axial center S. Assuming that a direction of the flute bottom diameter increasing toward the shank 22 is positive, a flute bottom of the first spiral flute 24 is formed to be constant or with a positive gradient in the axial direction and a flute bottom of the second spiral flute 26 is formed with a negative gradient. Specifically, an axial change gradient (axial gradient) θ1 of the flute bottom of the first spiral flute 24 is set to a constant value within a range of 0 to +0.6 degrees, and an axial change gradient (axial gradient) θ2 of the flute bottom of the second spiral flute 26 is set to a constant value within a range of −0.2 to −1 degrees. This example uses θ1≈+0.3 degrees and θ2≈−0.6 degrees. These axial gradients θ1 and θ2 can be formed by gradually changing depths of cut of the ball end mills 30 and 32 depicted in FIG. 6. Although the axial gradients θ1 and θ2 are desirably constant over the whole length of the spiral flutes 24 and 26, the gradients may somewhat change, Since the inner blade tip 14 cuts a hole inner circumferential side, the flute bottom diameter of the first spiral flute 24 must be reduced at a cutting edge portion thereof, i.e., the tip portion of the drill main body 12, and the axial gradient θ1 of the flute bottom is defined within a range of 0 to +0.6 degrees to acquire predetermined rigidity while ensuring chip discharge performance. Since the outer blade tip 16 cuts the hole outer circumferential side, a flute depth of the second spiral flute 26 may be shallow at a cutting edge portion thereof, i.e., the tip portion of the drill main body 12, and the flute bottom diameter is increased to acquire high rigidity while the axial gradient θ2 of the flute bottom is set to a negative gradient within a range of −0.2 to −1 degrees to make a flute cross section area larger toward the shank 22 to achieve higher chip discharge performance. By separately and properly defining the axial gradients θ1, θ2, the flute widths, and the flute depths of the first spiral flute 24 and the second spiral flute 26 in this way, the respective discharge performances of chips generated by the inner blade tip 14 and the outer blade tip 16 and the rigidity of the drill main body 12 can be ensured in a balanced manner.

Figure 5:
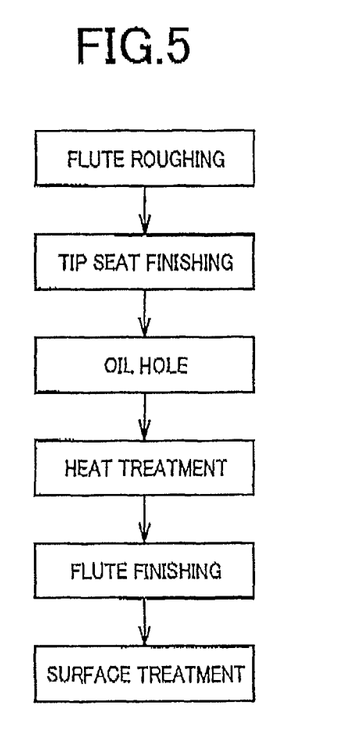
FIG. 5 is a diagram for explaining a manufacturing process of the drill main body of the indexable drill in FIG. 1.

The first spiral flute 24 and the second spiral flute 26 as described above are formed in two processes, i.e., flute roughing process of roughing through cutting by the ball end mills 30 and 32 and flute finishing process after a heat treatment process of applying a hardening heat treatment using quenching and tempering as depicted in FIG. 5. In the flute finishing process, the ball end mills 30 and 32 same as those used in the flute roughing process are used to perform cutting with a stock amount of 0.3 mm or less for mirror finishing of the first spiral flute 24 and the second spiral flute 26. The stock amount in the flute finishing process is appropriately defined in consideration of distortion due to the hardening heat treatment, a drill diameter D, etc., and the cutting is performed such that the stock amount at tips of the ball end mills 30 and 32 is about 0.2 mm in this example. As a result, each of flute inner surfaces of the first spiral flute 24 and the second spiral flute 26 is mirror-finished such that arithmetic average roughness Ra is 0.4 μm or less and maximum height roughness Rz is 1.6 μm or less. As a result of the mirror finishing of the first spiral flute 24 and the second spiral flute 26 as described above, friction of the flute inner surfaces is reduced and chips are favorably discharged.

Figure 7:
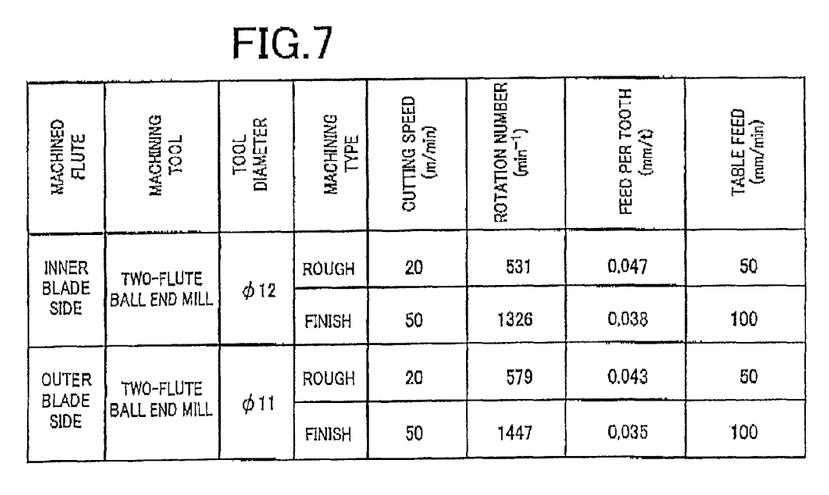
FIG. 7 is a diagram for explaining a difference in machining conditions in the flute roughing process and the flute finishing process of FIG. 5.
Figure 9:
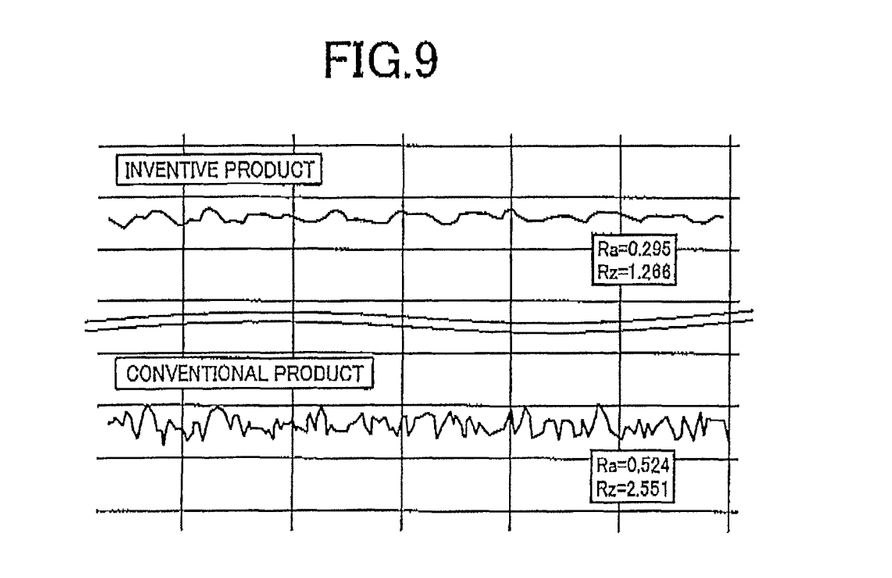
FIG. 9 is a diagram of comparison of measurement results between roughness curves of flute surfaces of an inventive product and a conventional product.

FIG. 7 depicts machining conditions of cutting by the ball end mills 30 and 32 in the flute roughing process and the flute finishing process for each of the first spiral flute 24 on the inner blade side and the second spiral flute 26 on the outer blade side and, a small stock amount (0.2 mm) in the flute finishing process enables high-speed cutting at a cutting speed of 50 m/min, resulting in preferable mirror finishing of the flute inner surfaces. In FIG. 7, "ROUGH" in a "MACHINING TYPE" field means the flute roughing process and "FINISH" means the flute finishing process. FIG. 9 is a diagram of comparison in the same scale between roughness curves acquired by measuring a surface roughness of flute inner surfaces of spiral flutes of an inventive product and a conventional product with a tracer method. The inventive product is subjected to electroless Ni (nickel) plating after the flute finishing process, and the conventional product is subjected to the electroless Ni plating without finish machining after the heat treatment although the hardening heat treatment was applied after cutting of the spiral flutes in the same way. When the arithmetic average roughness Ra and the maximum height roughness Rz are obtained based on the roughness curves of FIG. 9 in accordance with definition of JIS "B 0601 (revised in 2001)", the inventive product has Ra=0.295 μm and Rz=1.266 μm while the conventional product has Ra=0.524 μm and Rz=2.551 μm, which means that the both are improved to about ½.

As depicted in FIG. 4, an oil hole 40 is disposed from a rear end on the axial, center S of the drill main body 12 and branched into a Y-shape in the vicinity of the tip so that lubrication oil can be supplied (internally supplied) from openings 42 and 44 disposed in tip flanks as depicted in FIG. 2. As depicted in FIGS. 2 and 3, the side walls 36b and 38b of the tip mounting recesses 36 and 38 are disposed with respective chip breakers 46 and 48, each having arc-shaped cross sections, in substantially parallel with the axial center S from the tip of the drill main body 12 to (i.e. reaching) the first spiral flute 24 and the second spiral flute 26. In this example, each of the chip breakers 46 and 48 is formed by cutting with a ball end mill having a ball end cutting edge with R=5 mm to a depth of about 1 mm from the wall surfaces of the side walls 36b and 38b. When the chip breakers 46 and 48 are disposed in the side walls 36b and 38b as described above, chips generated by the inner blade tip 14 and the outer blade tip 16 are more favorably segmented by the chip breakers 46 and 48 and the chip discharge performance is further improved.

FIG. 5 is a process diagram for explaining an example of a manufacturing method of the drill main body 12 as described above and the flute roughing process by the ball end mills 30 and 32 are followed by finish machining of a tip seat performed by using the square end mill 34 etc. In the tip seat finishing process, after cutting of the tip mounting recesses 36 and 38 by using the square end mill 34, the recesses (tip mounting seats) for mounting tips are cut and the ball end mill is used for cutting of the chip breakers 46 and 48. After the oil hole 40 is formed by hole machining on the axial center S from the rear end of the drill main body 12, the hardening heat treatment using quenching and tempering is performed to achieve hardness of the drill main body 12 of about HRC55 through the hardening heat treatment. After performing the hardening heat treatment, the first spiral flute 24 and the second spiral flute 26 are mirror-finished in the flute finishing process by the same ball end mills 30 and 32 used in the flute roughing process. The electroless Ni plating is then applied to the whole circumference of the drill main body 12 including the flute inner surfaces of the first spiral flute 24 and the second spiral flute 26.

In the indexable drill 10 of this example, since the first spiral flute 24 and the second spiral flute 26 of the drill main body 12 are subjected to the hardening heat treatment and then mirror-finished through cutting by the ball end mills 30 and 32, the Motion of the flute inner surfaces is reduced and chips are favorably discharged. This suppresses wear, blade chipping, breakage etc., due to clogging of chips and improves durability (tool life) even in a deep hole machining indexable drill 10 having longer flute length L. An increase in cutting resistance due to clogging of chips is suppressed so that stable hole machining can be performed, and limiting machining conditions for enabling the hole machining are alleviated so that a machinable range is expanded.

In this example, the flute inner surfaces of the first spiral flute 24 and the second spiral flute 26 have the arithmetic average roughness Ra of 0.4 μm or less and the maximum height roughness Rz of 1.6 μm or less as a result of the mirror finishing and, therefore, chip discharge performance improving effect is properly acquired through reduction in friction of the flute inner surfaces of the first spiral flute 24 and the second spiral flute 26.

Since the axial gradient θ1 of the flute bottom of the first spiral flute 24 and the axial gradient θ2 of the flute bottom of the second spiral flute 26 are separately properly set in this example and the axial gradient θ1 of the first spiral flute 24 is set to a constant value within a range of 0 to +0.6 degrees while the axial gradient θ2 of the second spiral flute 26 is set to a constant value within a range of −0.2 to −1 degrees, the respective discharge performances of chips generated by the inner blade tip 14 and the outer blade tip 16 and the rigidity of the drill main body 12 can be ensured in a balanced manner. Particularly, since the flute widths and the flute depths of the first spiral flute 24 and the second spiral flute 26 are separately defined, the chip discharge performances and the rigidity can be ensured in a more balanced manner, Since the side walls 36b and 38b of the tip mounting recesses 36 and 38 are disposed with the cross-section arc-shaped chip breakers 46 and 48 from the tip of the drill main body 12 to the first spiral flute 24 and the second spiral flute 26 in this example, chips generated by the inner blade tip 14 and the outer blade tip 16 are favorably segmented and the chip discharge performance is further improved. Therefore, for example, even if hole machining is performed for a viscous work material, the chips are segmented and properly discharged and the clogging of chips is suppressed, Although the indexable drill 10 of this example is a deep hole machining drill having the flute length L equal to or greater than 4D relative to the drill diameter D and the clogging of chips more easily occurs due to the longer flute length L, since the first spiral flute 24 and the second spiral flute 26 are mirror-finished after the hardening heat treatment while the axial gradient θ1 of the flute bottom of the first spiral flute 24 and the axial gradient θ2 of the flute bottom of the second spiral flute 26 are separately set and the side walls 36b and 38b of the tip mounting recesses 36 and 38 are disposed with the chip breakers 46 and 48, excellent chip discharge performance can be achieved while the rigidity of the drill main body 12 is ensured, and various effects are more prominently be achieved in association with the improvement in the chip discharge performance.

Since the same ball end mills 30 and 32 used in the flute roughing process are used for flute finish cutting with a stock amount of 0.3 mm or less after the hardening heat treatment in this example, the flute inner surfaces of the first spiral flute 24 and the second spiral flute 26 can properly be mirror-finished. Particularly, since the high-speed cutting is performed at the cutting speed of 50 m/min, the flute inner surfaces are more preferably mirror-finished.

Figure 10:
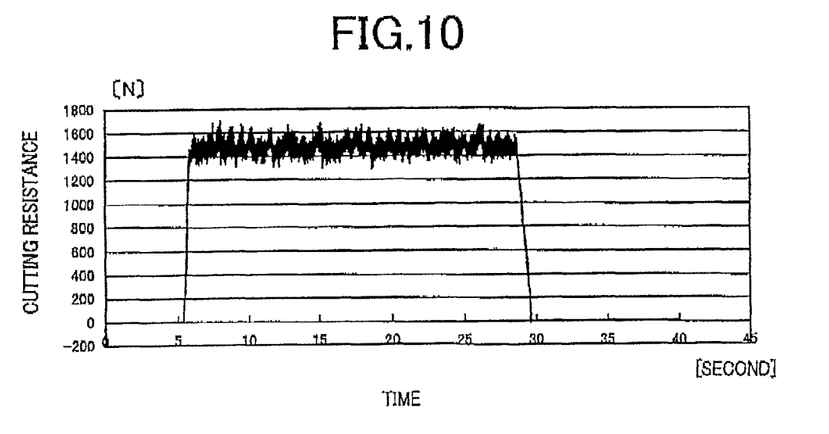
FIG. 10 is a diagram for depicting measurement results of cutting resistance when hole machining is performed by using an inventive product.
Figure 11:
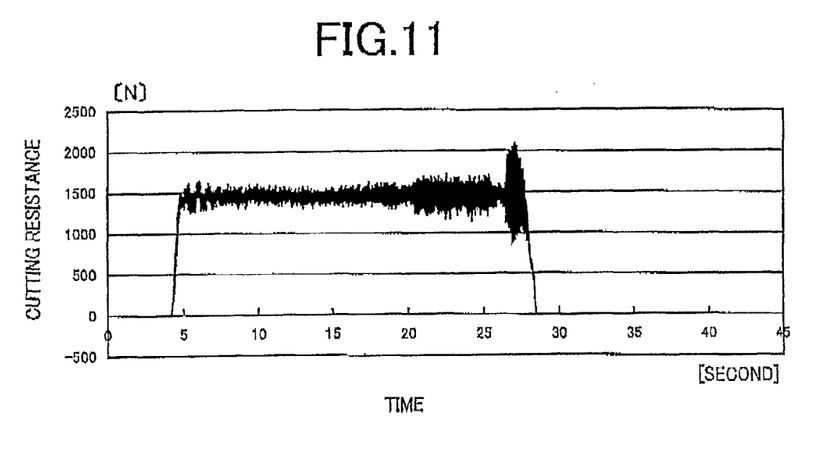
FIG. 11 is a diagram for depicting measurement results of cutting resistance when hole machining is performed by using a conventional product.

FIGS. 10 and 11 depict measurement results of measurement of cutting resistance when hole machining is performed by using an inventive product and a conventional product under the following machining conditions and FIGS. 10 and 11 depicts the results of the inventive product and the conventional product, respectively. The inventive product is the indexable drill 10 of this example. The conventional product is subjected to surface treatment (electroless Ni plating) without the mirror finishing through finish machining after the hardening heat treatment and has both the axial gradient θ1 of the flute bottom of the first spiral flute 24 and the axial gradient θ2 of the flute bottom of the second spiral flute 26 set to zero degrees without disposing the chip breakers 46 and 48. The work material "S50C" in the following machining conditions is carbon steel for machine structure defined by HS.

<Machining Conditions>
Machining hole diameter: ϕ25
Machining depth: 50 mm
Work material: S50C
Cutting speed V: 180 m/min
Feed speed F: 0.18 mm/rev
Machining machine: horizontal machining center
Cutting oil: water-soluble cutting oil (internal oil feed)

As apparent from graphs of cutting resistance values of FIGS. 10 and 11, the value is within a range of about 1300N to 1700N from start to end of the hole machining in FIG. 10 related to the inventive product. On the other hand, in FIG. 11 related to the conventional product, the value is substantially the same as the inventive product until the middle of the hole machining; however, amplitude of cutting resistance increases after the machining depth exceeds about 35 mm (about 20 seconds in terms of time on the horizontal axis) and the cutting resistance varies with large amplitude exceeding 1000N to 2000N in the final phase when the machining depth reaches about 50 mm. This is considered to be caused because the chip discharge performance deteriorates after the machining depth exceeds about 35 mm and variation in cutting resistance is increased due to the clogging of chips.

Figure 12:
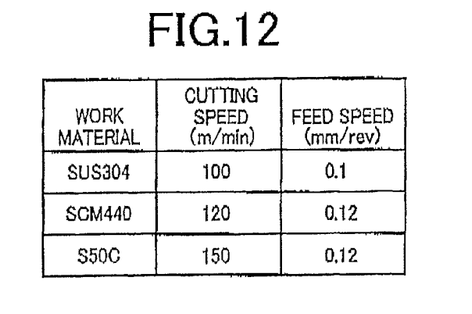
FIG. 12 is a diagram for explaining respective machining conditions when hole machining is performed for multiple types of work materials by using the inventive product and the conventional product and durability is examined.
Figure 13:
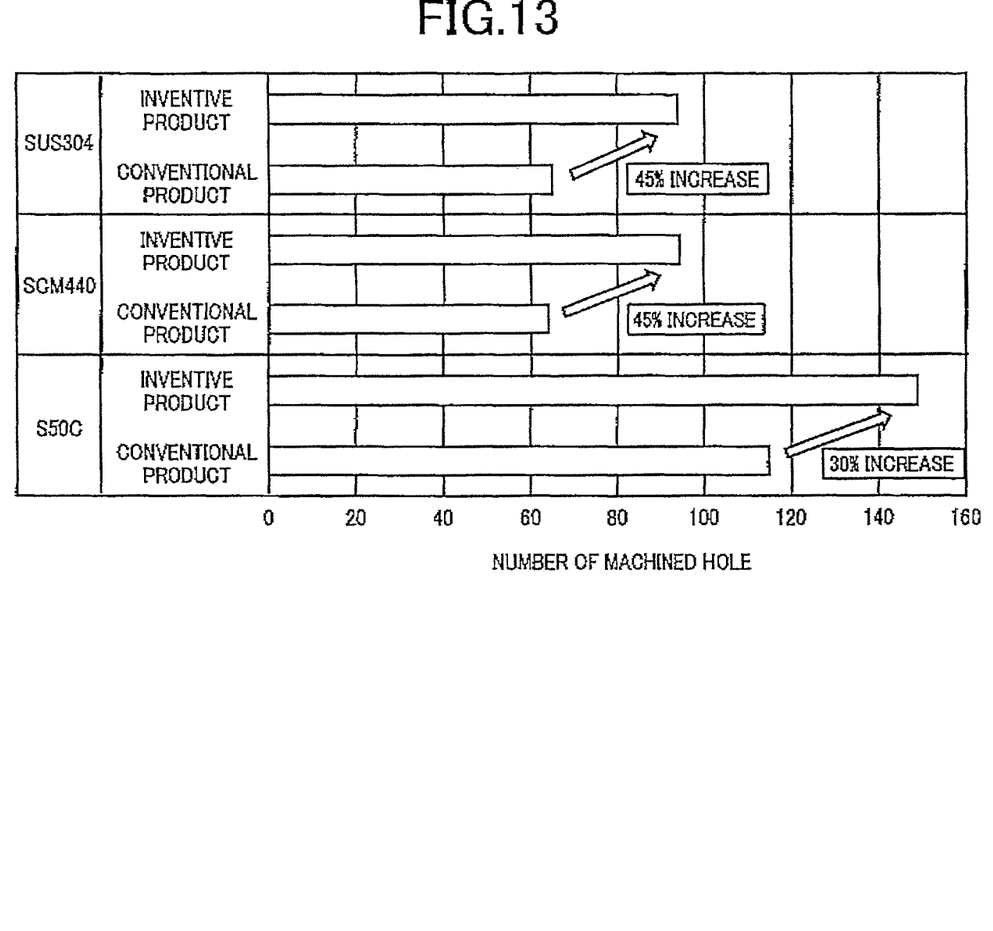
FIG. 13 is a diagram for depicting test results of examining durability when hole machining is performed for multiple types of work materials in accordance with the respective machining conditions of FIG. 12 by using the inventive product and the conventional product.

FIGS. 12 and 13 are diagrams for explaining results of examining durability when hole machining is performed for multiple types of work materials by using the inventive product and the conventional product; FIG. 12 is a diagram of respective machining conditions of the multiple types of work materials; and FIG. 13 is a diagram of respective durability test results of the multiple types of work materials. The inventive product and the conventional product are the same as those used in the tests of FIGS. 10 and 11. The machining conditions other than the cutting speed and the feed speed depicted in FIG. 12 are as follows and the same regardless of a type of work material, and the number of machined holes was examined until a wear width of a cutting edge reached 0.3 mm. The both work materials "SUS304" and "SCM440" of FIG. 12 are those defined by JIS and "SUS304" and "SCM440" are stainless steel and chromium molybdenum steel, respectively.

<Machining Conditions>
Machining hole diameter: φ25
Machining depth: 125 mm
Machining machine: horizontal machining center
Cutting oil: water-soluble cutting oil (internal oil feed)

As apparent from results of FIG. 13, the inventive product significantly improves the durability for all the work materials as compared to the conventional product. Specifically, the durability is improved by about 45% for SUS304 and SCM440 and the durability is improved by about 30% for S50C.

Figure 14:
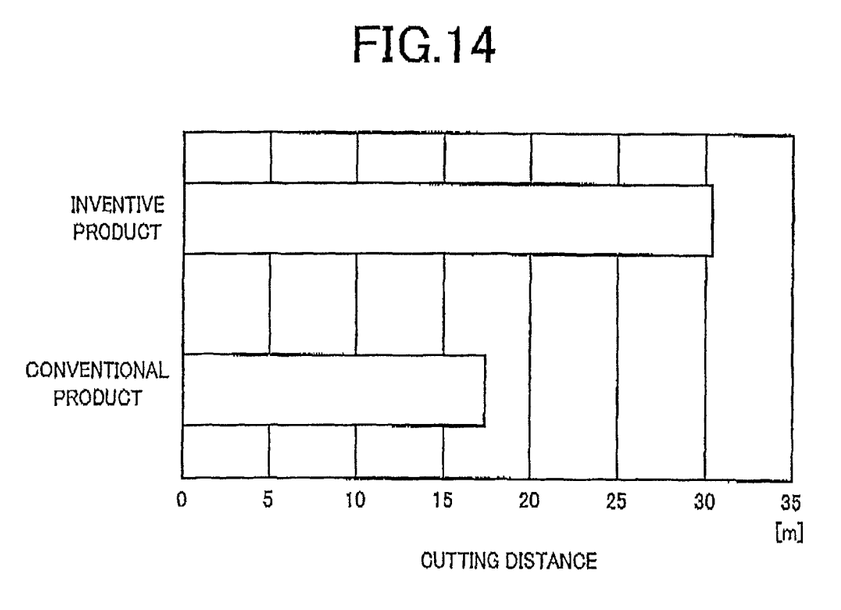
FIG. 14 is a diagram of another test result when a durability test is performed by using the inventive product and the conventional product.

FIG. 14 is a diagram of another test result when a durability test is performed by using the inventive product and the conventional product. To examine a difference in durability due to presence of mirror finishing, the inventive product is prepared by performing the mirror finishing through finish machining after the hardening heat treatment and the surface treatment (electroless Ni plating) in the same way and by setting both the axial gradient θ1 of the flute bottom of the first spiral flute 24 and the axial gradient θ2 of the flute bottom of the second spiral flute 26 to zero degrees without disposing the chip breakers 46 and 48 as compared to the indexable drill 10 of the example. The conventional product is the same as that used in the test of FIG. 11, is subjected to the surface treatment (electroless Ni plating) without the mirror finishing through finish machining after the hardening heat treatment, and has both the axial gradient θ1 of the flute bottom of the first spiral flute 24 and the axial gradient θ2 of the flute bottom of the second spiral flute 26 set to zero degrees without disposing the chip breakers 46 and 48. The hole machining was performed under the following machining conditions to examine a cutting distance (the number of machined holes×machining depth) until a wear width of a cutting edge reaches 0.3 mm or the machining becomes impossible.

<Machining Conditions>
Machining hole diameter; φ25
Machining depth: 125 mm
Work material; S50C
Cutting speed V: 150 m/min
Feed speed F: 0.18 mm/rev
Machining machine: horizontal machining center
Cutting oil: water-soluble cutting oil (internal oil feed)

As apparent from the test result of FIG. 14, the inventive product improves the durability by about 70% as compared to the conventional product. In this durability test, the machining with the conventional product became impossible due to chipping of the outer blade tip 16, which is considered to be caused by biting of chips. On the other hand, the hole machining with the inventive product could be continued until the wear width of the cutting edge reaches 0.3 mm.

Although the example of the present invention has been described in detail with reference to the drawings, this is merely an embodiment and the present invention may be implemented in variously modified and improved forms based on the knowledge of those skilled in the art.

NOMENCLATURE OF ELEMENTS

10: indexable drill 12: drill main body 14; inner blade tip 16; outer blade tip 24: first spiral flute 26: second spiral flute 30, 32; ball end mill 36, 38: tip mounting recess 36b, 38b: side wall 46, 48: chip breaker S: axial center L: flute length D: drill diameter θ1, θ2; an axial gradient of a flute bottom

The invention claimed is:

1. A drill main body of an indexable drill disposed with a pair of first and second spiral flutes on a column-shaped outer circumferential surface with an inner blade tip cutting a hole center side mounted on a tip portion of the first spiral flute and an outer blade tip cutting a hole outer circumferential side mounted on a tip portion of the second spiral flute, the drill main body of an indexable drill discharging chips through the first spiral flute and the second spiral flute toward a shank while hole machining is performed with the inner blade tip and the outer blade tip,
   the drill being a deep hole machining drill having a length L of the first spiral flute and the second spiral flute equal to or greater than 4D relative to a drill diameter D that is an outer diameter of the outer blade tip,
   the first spiral flute being formed with a flute bottom diameter having a positive gradient such that the flute bottom diameter increases toward the shank, in axial direction, wherein the first spiral flute is formed with the flute bottom diameter having the positive gradient, and
   the second spiral flute being formed with a flute bottom diameter having a negative gradient such that the flute bottom diameter decreases toward the shank in axial direction.

2. The drill main body of an indexable drill of claim 1, wherein
   the first spiral flute is formed with a flute bottom diameter having a constant positive gradient such that the flute bottom diameter increases toward the shank, in axial direction, over the whole length of an effective flute length, and wherein
   the second spiral flute is formed with a flute bottom diameter having a constant negative gradient such that the flute bottom diameter decreases toward the shank in axial direction, over the whole length of the effective flute length.

3. The drill main body of an indexable drill of claim 1, wherein
   the first spiral flute and the second spiral flute are disposed with respective tip mounting recesses cut out at substantially right angle for mounting the inner blade tip and the outer blade tip on a drill main body tip side, and wherein
   at least the tip mounting recess for mounting the inner blade tip has a side wall disposed with a chip breaker having an arc-shaped cross-section from a tip of the drill main body to the first spiral flute.

4. The drill main body of an indexable drill of claim 1, wherein
   the first spiral flute and the second spiral flute are finish-machined through cutting by a ball end mill after a hardening heat treatment is applied.

5. The drill main body of an indexable drill of claim 4, wherein
   surface roughness of the first spiral flute and the second spiral flute is 0.4 μm or less in terms of arithmetic average roughness Ra and 1.6 μm or less in terms of maximum height roughness Rz as a result of a finish machining.

\* \* \* \* \*